(12) United States Patent
Bell et al.

(10) Patent No.: US 11,095,738 B2
(45) Date of Patent: Aug. 17, 2021

(54) PUSH NOTIFICATIONS FOR MULTIPLE USER DEVICES

(71) Applicant: Apple Inc., Cupertino, CA (US)

(72) Inventors: Christopher M. Bell, San Jose, CA (US); Christoph Paasch, Cupertino, CA (US)

(73) Assignee: Apple Inc., Cupertino, CA (US)

(*) Notice: Subject to any disclaimer, the term of this patent is extended or adjusted under 35 U.S.C. 154(b) by 756 days.

(21) Appl. No.: 15/627,852

(22) Filed: Jun. 20, 2017

(65) Prior Publication Data

US 2018/0124195 A1    May 3, 2018

Related U.S. Application Data

(60) Provisional application No. 62/417,213, filed on Nov. 3, 2016.

(51) Int. Cl.
| | |
|---|---|
| *H04L 29/08* | (2006.01) |
| *H04W 4/18* | (2009.01) |
| *H04L 12/18* | (2006.01) |
| *H04L 12/58* | (2006.01) |
| *H04W 4/80* | (2018.01) |
| *H04W 4/021* | (2018.01) |

(52) U.S. Cl.
CPC .......... *H04L 67/26* (2013.01); *H04L 12/1859* (2013.01); *H04L 12/1895* (2013.01); *H04W 4/185* (2013.01); *H04L 51/04* (2013.01); *H04L 67/10* (2013.01); *H04L 67/24* (2013.01); *H04L 67/306* (2013.01); *H04W 4/021* (2013.01); *H04W 4/80* (2018.02); *Y02D 30/70* (2020.08)

(58) Field of Classification Search
CPC ......... H04L 67/26; H04L 67/10; H04L 29/06; H04W 4/021; H04W 4/02
See application file for complete search history.

(56) References Cited

U.S. PATENT DOCUMENTS

| | | | |
|---|---|---|---|
| 7,890,427 B1 * | 2/2011 | Rao ......................... | G06F 21/64 705/51 |
| 2003/0097410 A1 * | 5/2003 | Atkins ..................... | H04L 29/06 709/206 |
| 2004/0185777 A1 * | 9/2004 | Bryson ................... | H04L 29/00 455/41.1 |

(Continued)

*Primary Examiner* — Joshua D Taylor
(74) *Attorney, Agent, or Firm* — Dickinson Wright RLLP

(57) ABSTRACT

A server network accepts asynchronous notification messages from multiple application servers and efficiently routes notification messages in the form of notification taps to a user device, which can operate in a low power mode. The user device may or may not be a cellular device. The server network maintains states for the user devices in terms of identifiers useful for routing. A network server proximate to the user device registers the identifiers useful for routing the notifications. When the server network receives a notification from a source application, the proximate network server determines a routing based on the registration and sends a notification tap to the user device. The user device can obtain notification content sourced by the source application. The user device can delegate the role of receiving notification taps to a delegate device, where the delegate device may have wall-power and/or a wired or wireless network connection.

20 Claims, 12 Drawing Sheets

(56) References Cited

U.S. PATENT DOCUMENTS

| | | | |
|---|---|---|---|
| 2004/0203702 A1* | 10/2004 | Burgess | H04W 48/12 |
| | | | 455/422.1 |
| 2007/0249352 A1* | 10/2007 | Song | H04W 12/0602 |
| | | | 455/436 |
| 2011/0059748 A1* | 3/2011 | Taylor | H04W 4/021 |
| | | | 455/456.1 |
| 2011/0145152 A1* | 6/2011 | McCown | G06Q 20/02 |
| | | | 705/67 |
| 2012/0195294 A1* | 8/2012 | Shah | H04L 41/0806 |
| | | | 370/338 |
| 2012/0295645 A1* | 11/2012 | Yariv | H04W 4/12 |
| | | | 455/466 |
| 2013/0174060 A1* | 7/2013 | Odell | G06Q 10/107 |
| | | | 715/758 |
| 2014/0321417 A1* | 10/2014 | Yang | H04L 65/1046 |
| | | | 370/329 |
| 2015/0281009 A1* | 10/2015 | Melcher | H04L 67/10 |
| | | | 709/224 |
| 2017/0019777 A1* | 1/2017 | Cole, Jr. | H04W 4/02 |

\* cited by examiner

PUSH NOTIFICATIONS FOR MULTIPLE USER DEVICES

CROSS-REFERENCE TO RELATED APPLICATIONS

This Application claims the benefit of U.S. Provisional Patent Application No. 62/417,213, entitled "PUSH NOTIFICATIONS FOR MULTIPLE USER DEVICES" filed Nov. 3, 2016, the content of which is incorporated by reference herein in its entirety for all purposes.

FIELD

The described embodiments relate generally to communications using electronic devices, including systems and techniques for providing push notifications to multiple user devices.

BACKGROUND

Today, a user can have multiple active electronic devices available for communication, sometimes collocated and at other times distributed at different locations. In addition to a smart phone, a user may also have a tablet device, a laptop computer, a desktop computer, a portable media player, a wearable computing device, and/or one or more other electronic devices, some or all of which may be able to conduct wireless communications using one or more different radio access technologies (RATs) and/or wired communications. The multiple different electronic devices can be associated with a common user account, and the user of the multiple electronic devices can receive notifications for various applications and/or services on one or more of the multiple electronic devices. The notifications can be indicated to the user by one or more different outputs from the various electronic devices, such via as an audible indication (e.g., a ringtone or alert sound), a visual indication (e.g., a pop-up window, a drop down window, or an application badge or icon change), and/or a haptic indication (e.g., a vibration or tapping pattern). Individual applications and services on each of the user's multiple electronic devices can receive push notifications, and with the proliferation of electronic devices and applications thereon, some wireless network architectures are unable to support enough simultaneous semi-persistent higher layer connections for all electronic devices to communicate with network-based servers that support the applications and services that seek to provide push notifications to the electronic devices.

In view of the foregoing, there is a need for a push notification architecture to reduce network loading and intelligently and efficiently manage notifications for multiple user devices to provide the best user experience possible.

SUMMARY

Representative embodiments set forth herein disclose various systems and techniques for intelligently and efficiently managing push notifications for multiple user devices. The embodiments set forth various systems and techniques for communicating notifications for applications and/or services to user devices via one or more network-based edge servers with which a set of multiple associated user devices are registered. Each user device can be associated with a common network-based service account, e.g., an iCloud® account, and can be configured to receive notifications for various applications and services. A user device can receive notifications directly from an associated edge server or via one or more intermediate nodes and/or delegated user devices. Delegation of user devices to other associated user devices can be based on a default configuration and/or a user configurable setting, which can vary for different applications and services as well as based on capabilities of the user devices. Rather than use a semi-persistent higher layer connection, e.g., at a Transport Control Protocol (TCP) layer, with keep-alive messaging to retain the higher layer connection between a user device and a distant network-based server that generates notifications to push to the user device, the user device registers with a network-based edge server that coalesces notifications received from various sources for the user device. The edge server sends separately a notification tap, to indicate availability of notifications, and subsequently provides notification content, which can be retrieved by the user device and/or by delegated user devices. The notification tap can be provided to the user device: (i) via a cellular paging mechanism when the user device is reachable via a cellular wireless network, (ii) via a wireless personal area network (WPAN) connection, such as a Bluetooth classic or Bluetooth Low Energy (BTLE) connection when the user device is reachable via another nearby associated user device, (iii) via a wireless local area network (WLAN) connection, such as a Wi-Fi connection when the user device is reachable through a WLAN network, (iv) via a peer-to-peer wireless connection from another associated user device, and/or (v) via a wired connection, e.g., an Ethernet connection, when the user device is reachable through a wired network. Notification content for a particular user device can be cached at the edge server and/or at one or more delegated user devices for later retrieval by the particular user device. A user device can optionally take actions in response to a notification tap to retrieve notification content for pending cached notifications. Splitting notifications for user devices into two parts, a notification tap with no content provided initially, and a notification portion that includes content payload provided separately allows for efficient low-bandwidth push indications of available notifications with on demand pull retrieval by requesting user devices of notification content conveniently stored at a proximate edge server and/or at a delegated user device. Notification content need not be sent to multiple user devices, thereby reducing data traffic loading, and a low latency notification tap can be provided with minimal signaling. Additionally, the notification tap can be sent without encryption reducing the processing power required for processing the notification taps, as the notification content can be sent separately with secure end-to-end encryption. The embodiments disclosed herein apply to one or more user devices, some of which can include wireless capability, but can also be used beneficially for wired user devices as well. In some embodiments, some of the user devices are wireless cellular devices; while in some embodiments, the notification methods and apparatuses described can operate without a wireless cellular device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

DETAILED DESCRIPTION

Figure 1:
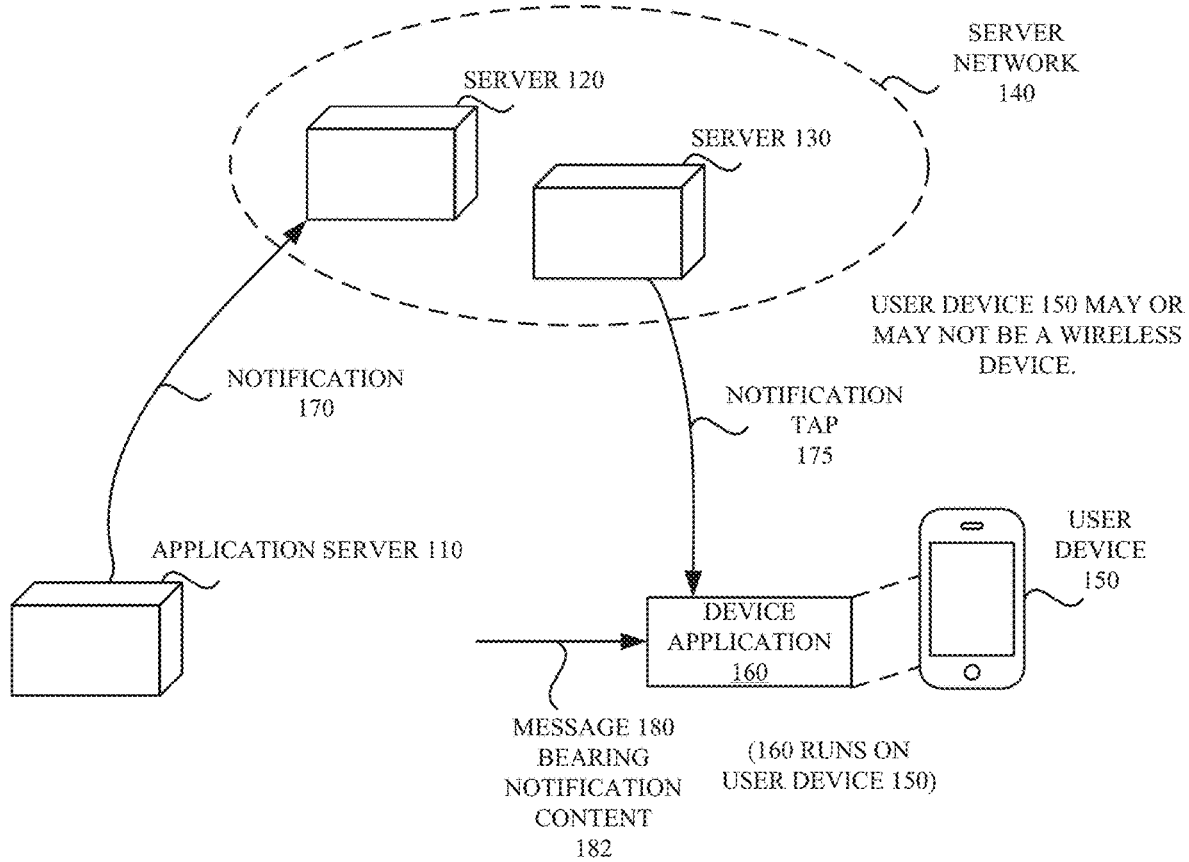
FIG. 1 illustrates an exemplary notification tap architecture, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments set forth herein disclose various systems and techniques for intelligently and efficiently managing notifications for multiple user devices. The embodiments set forth various systems and techniques for communicating notifications for applications and/or services to user devices via one or more network-based edge servers with which a set of multiple associated user devices register. The term "notification" is used to refer to any information presented via a user interface (UI) of a user device for an application and/or service, particularly for important events. Notifications can appear at the top or corner of a screen (also referred to as a banner) for a short period of time or can overlay in the center of the screen until acknowledged or until a timeout occurs. Some notifications associated with applications provide an indication as a badge overlaid on the application icon. The term "notification" will be used to refer to any such notification indication whether a banner, a pop-up window, or an actionable interrupt. Many applications and services can provide for notifications to present supplemental information at a user device, such as to indicate initiation of a proposed service connection (voice, video, Internet messaging, teleconferencing, etc.), to catalog one or more events (email, voice mail, reminders, appointments, etc.), or to indicate near real time information (stock, weather, sports, news, etc.). Notifications can be organized into various categories and presented to the user of the mobile wireless communication device on demand (e.g., in response to a user input), as an overlay (e.g., as an indicator associated with a graphical icon), or as an interrupt (e.g., as a pop-up message requiring a user response). User devices can be configured to present notifications in different forms, e.g., based on user preference or based on applicability to a service/application. The notifications can be provided by one or more different outputs from the various user devices, such as an audible indication (e.g., a ringtone or alert sound), a visual indication (e.g., a pop-up window, a drop down window, or an application badge or icon change), and/or a haptic indication (e.g., a vibration or tapping pattern). Both the user of a set of associated user devices and at least some of the user devices are mobile, and as such, how to reach a user device (or set of multiple user devices) to provide notifications can change over time.

Each user device can be associated with a common network-based service account, e.g., an iCloud account, and can be configured to receive notifications for various applications and services. When a user device is not in proximity to any other associated user devices, the user device can function as a primary user device and provide notifications to a user based on a default configuration and/or based on a user configurable setting, which can vary for different applications and services. When the user device is within proximity of one or more other associated user devices, the user devices can exchange relevant capability information among each other, such as device type, software versions, hardware versions, configuration settings, operating states, battery level, user interaction states, and/or power source. The user devices can also exchange information for applications that are synchronized via network-based services, such as via iCloud or via application specific servers. Representative applications include a scheduling calendar, an email application, a "reminder" or "to do" list, social networking applications, in addition to communication services that can provide voice connections, video connections, and/or messaging connections. The user devices can negotiate dynamically or be configured to determine to which of the user devices to provide notifications for a set of applications and services common to a set of user devices.

Each user device of a set of associated user devices can register with a proximate edge server and obtain a globally unique identifier (guid) from the proximate edge server. The user device, if capable of cellular wireless communications, can obtain from a cellular wireless base station, e.g., an eNodeB, a device identifier (for example, a unique international mobile subscriber identity (IMSI)) and a cellular wireless gateway address, e.g., a resolvable domain name server (DNS) address and/or an Internet Protocol (IP) address, for a gateway that can provide a notification indication via a cellular wireless system, e.g., a paging system, to the user device. The user device can register its presence with the proximate edge server by sending the device identifier, the cellular wireless gateway address, and the GUID to the proximate edge server. The edge server can provide a notification indication, e.g., a "notification tap", to the user device via the cellular wireless gateway, e.g., by sending a message to the cellular wireless gateway address to page the user device and indicate one or more available notifications. The edge server can maintain a semi-persistent higher layer connection, e.g., at the TCP layer, with one or more source servers that generate notifications for applications and/or services for the user device. The edge server can coalesce notifications from multiple applications and servers for the user device to provide a consolidated notification tap to the user device to indicate availability of the notifications for retrieval. In some embodiments, the user device can delegate presence to another user device that is associated with a common user account, e.g., an iCloud account, and the notification taps for the notifications can be sent to the delegated user device, which can forward the notification tap to the user device. Additionally, the edge server and the delegated user device can cache notification content for the notifications for retrieval on demand by the user device. In some embodiments, the user device can delegate presence to multiple delegated user devices in parallel. In some embodiments, a delegated user device can consolidate notifications for multiple associated user devices and provide notification taps and notification content to individual user devices on demand.

In some embodiments, a user device in the set of associated user devices can maintain a "keep alive" protocol to confirm relative proximity between the user device and one or more delegated user devices. In some embodiments, the set of user devices detect proximity to each other and communicate with each other based on a wireless personal area network (WPAN) wireless communication protocol, e.g., a Bluetooth® (BT) Classic or Bluetooth Low Energy (BTLE) wireless communication protocol, and/or based on a wireless local area network (WLAN) wireless communication protocol, e.g., a peer-to-peer Wi-Fi wireless communication protocol or an Apple Wireless Direct Link (AWDL) wireless communication protocol.

Accordingly, the foregoing approaches provide systems and techniques for intelligently and efficiently managing notifications for multiple user devices. A more detailed discussion of these systems and techniques is set forth below and described in conjunction with FIGS. 1 through 12, which illustrate detailed diagrams of systems and methods that can be used to implement these systems and techniques.

Notification Taps

A user device can include one or more device applications that can interact with one or more application servers associated with one or more source entities. For each application, an application server associates the user device with a user account alias, which can also be referred to as a user account identifier. A user device may be referred to herein as a device. When an event occurs at a source entity, the application in the user device must be promptly informed of the event. A network of servers can provide a notification service to convey event data to the application in the user device. The event data may be simply a notification indication. Such a notification indication can be referred to as a notification tap, analogous to a tap on the shoulder. Content related to the event can be obtained by the device application after receipt of the notification tap; this content can be referred to as notification content or, in some specific instances, as a notification content package. For example, the application server can be hosted by a web service such as an auction forum or a web-based retailer. The user device can be a cellular phone, a tablet, a laptop, a desktop computer, a wireless-enabled wearable device such as a watch, or an internet-connected media server (e.g., AppleTV). The network of servers can include a collection of servers known as edge servers. The network of servers can include one or more device registries. The user device can obtain a globally unique identifier (GUID) from an edge server. Each device registry contains entries associating the user account alias with particular devices and includes the GUID for each user device. Last hop delivery from an edge server to the user device can be via a gateway. The gateway can be co-located with, for example, a cellular base station such as a Long Term Evolution (LTE) eNodeB and radio tower or a Wi-Fi access point (AP). In some embodiments, routing is done without use of a path through a cellular network and no gateway is involved.

To avoid maintaining a communication network link state for millions of user devices, the device registry maintains an association that links a user account alias with one or more user devices. This device registry is used on an on demand basis, thus eliminating any link state requirement. The device registry can serve one or more edge servers. An exemplary pathway for a notification tap to flow from the application server to the user device is established as follows, in some embodiments.

1) The user device obtains the gateway address from the gateway.

2) The user device sends the gateway address to an edge server and sends a device identifier to the edge server. The device identifier can be a generic identifier, which may be pre-existing or may be a temporary identifier generated by the network. A pre-existing identifier that may be used in some embodiments is an international mobile subscriber identity (IMSI).

3) The edge server stores the device identifier and the gateway address in a routing table.

4) When an event occurs at the application server, a notification is sent to an edge server (the application server is aware of the user account alias created or provided when the device application is installed in the user device).

5) The edge server maps the user account alias in the notification to the one or more guids associated with the user account.

6) Based on the guid values, the edge server forwards the notifications to an edge server proximate to the devices of the user account (when the devices of the user account are split geographically, the notifications can be forwarded as necessary to all proximate edge servers).

7) The proximate edge server maintains a list or history of recent notification taps (GUIDs, sources (application servers), and a timestamp for each notification tap).

8) The proximate edge server sends a notification tap to the user devices, possibly via a paging channel (the user devices may have delegated their presence to a delegate device, in which case the notification tap flows to the delegate device).

9) The user device that received the notification tap, in some embodiments, establishes an event-driven temporary connection, e.g., TCP-based via a cellular data bearer channel, to fetch one or more (a batch of) notifications after receiving the notification tap. While the temporary connection is established, any new notifications for the device can be routed directly over the temporary connection. The user device, in some embodiments, requests the notification content from the proximate edge server (when a delegate device received the notification tap, it forwards the notification tap to one or more recipients (delegating devices) using a low-power wireless communication protocol, e.g., via Bluetooth Low Energy or Bluetooth Classic) when available or via another wireless communication protocol, e.g., via Wi-Fi or wireless peer-to-peer communication.

Some exemplary benefits of the notification tap architecture are as follows. The user device does not need a steady state semi-persistent higher layer connection to the edge servers nor does it need such connections to application servers. For example, each application and/or service in a collection of device applications and services for a user device can send notifications to the user device. An example of a device application can also be referred to as a client application. The techniques presented herein apply generally to applications installed on a user device; however, the applications are not limited to those involved in a client-server relationship. In some existing architectures, notifications can be supported by semi-persistent higher layer connections, e.g., at a TCP layer, between a given application server hosting a source application and a given user device hosting a device application. Storing TCP state for each of these applications in the network of a mobile network operator (MNO) that provides service to the user device is not scalable. In exemplary embodiments disclosed herein, the notification can be parsed into multiple parts, e.g., the notification tap and the notification content. The notification tap can be sent through an existing low-latency network such as via a cellular paging radio resource control (RRC) signaling channel (LTE, UMTS, GSM), or via a legacy one-way paging system separate from the cellular system. The details of the delivery method are opaque to the application server. After installation of the device application in the user device and creation of an entry in the routing table, the edge servers can carry the burden of delivering notifications for the device application to the user device. The edge servers can also fetch notification content from the application server in response to requests from the user device (or from associated delegated user devices), such as following sending a notification tap to the user device (and/or to the delegated user device(s)). The notification tap can be provided to the user device, directly or via intermediate delegated user devices, without undue steady-state power drain from the user device yet with low latency.

FIG. 1 illustrates a diagram 100 of an application server 110 in communication with a user device 150 via a server network 140. The server network 140 includes servers 120 and 130. Servers 120 and 130 may also be referred to herein as edge servers. A device application 160 is installed on the user device 150. As noted in FIG. 1, user device 150, in some embodiments, may or may not be a cellular device. For example, user device 150 in some embodiments, includes a cellular phone, a tablet, a laptop, a desktop computer, a wireless-enabled wearable device such as a watch, and/or an internet-connected media server.

After an event occurrence at a source, e.g., at an application server 110, a notification 170 is sent to the server 120 of the server network 140 based on an association known at the application server 110 between a user account alias and the server network 140. Upon receiving the notification 170, the server 120 determines that server 130 can deliver a notification tap to the user device 150. Formation of a notification tap 175 from the notification 170 is indicated on FIG. 1 with an arrow near the bottom of the figure.

The server network 140 provides the notification tap 175 for the notification 170 received from the application server 110. Notification content 182 for the notification 170 includes payload or data that the application server 110 seeks to convey to the device application 160 of the user device 150. The application server 110, in some embodiments, can also send the notification content 182 to the server 120 of the server network 140. In some embodiments, the application server 110 only sends the notification 170 to the server network 140 and awaits a request for the notification content 182.

Figure 2:
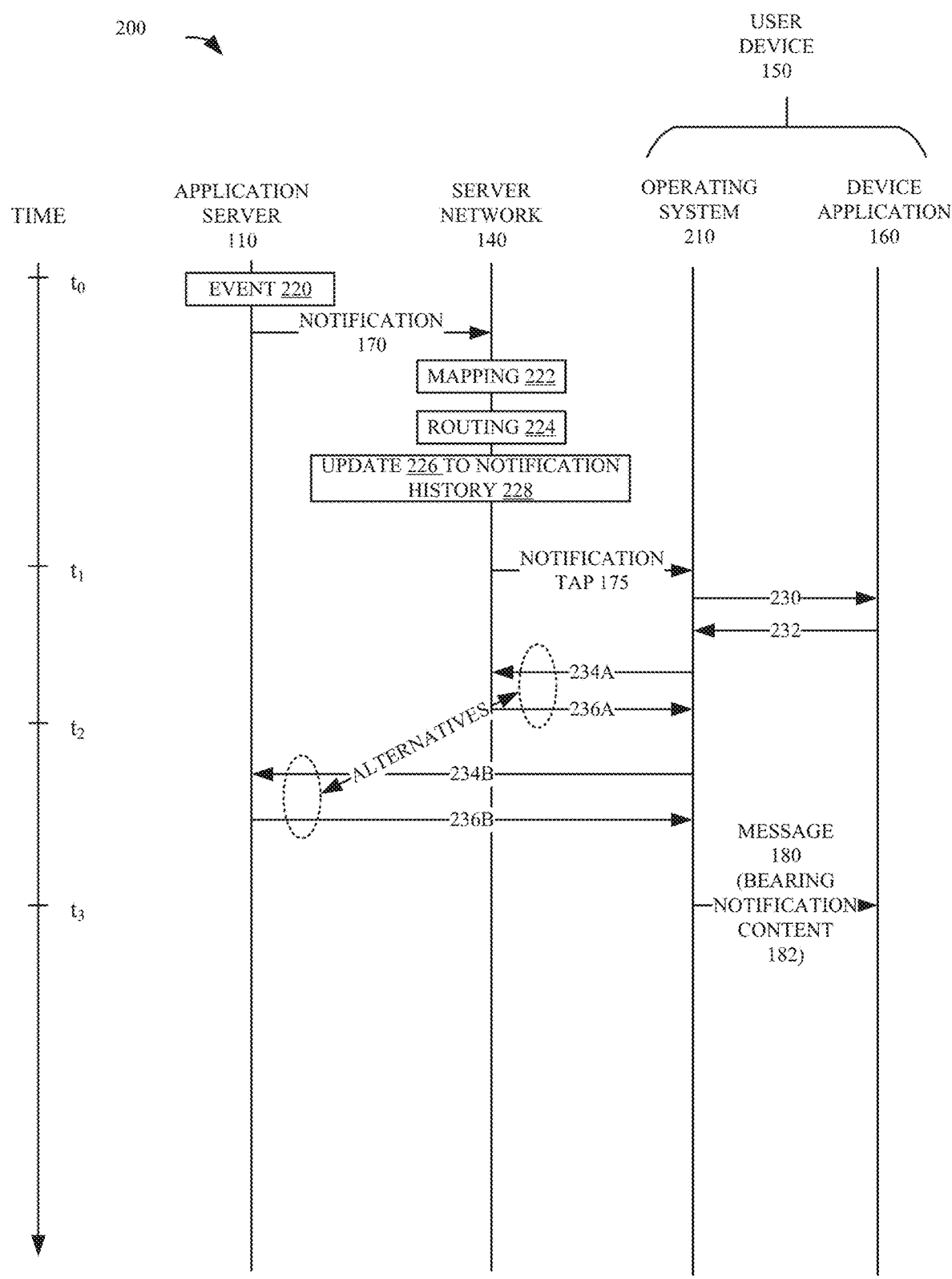
FIG. 2 illustrates an exemplary message flow in the notification tap architecture of FIG. 1, according to some embodiments.
Figure 9:
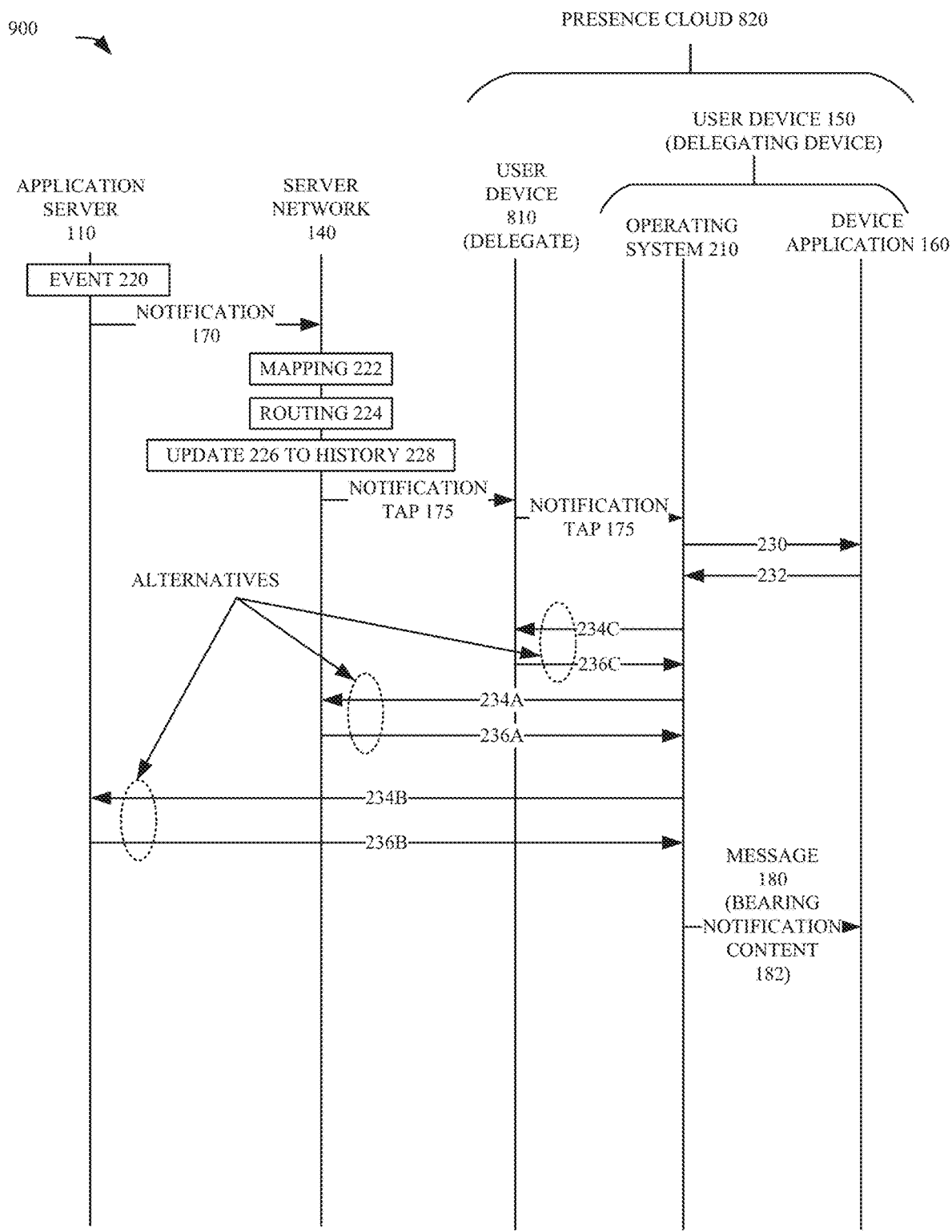
FIG. 9 illustrates exemplary messages and activities in a notification tap architecture including a presence cloud, according to some embodiments.

The notification content 182, payload information that is distinct from the notification tap 175, is indicated at the bottom of FIG. 1 and also indicated as being delivered in a generic message 180. In some embodiments, the notification tap 175 is conveyed to the user device 150 without encryption. Transmission of notification tap 175, in some embodiments without encryption makes additional channels available for conveyance and saves processing power and avoids delay required for encryption and decryption operations. The notification content 182 can be stored at convenient retrieval locations and fetched from those locations by the user device 150. This reduces traffic because the notification content is only sent to those devices requesting it and reduces latency because a retrieval location can be reached directly by the user device 150 without re-traversing the network path that the notification tap 175 followed. The multiple-retrieval aspects of the architecture are illustrated in subsequent figures. For example, as shown in FIG. 2, the user device 150 can fetch the notification content 182 from the server network 140 (messages 234A and 236A), and/or from the application server 110 (messages 234B and 236B). Also, as shown in FIG. 9 and illustrated in logic 1106-1108-1110 of FIG. 11, the user device 150 can fetch the notification content 182 from those locations and also from a delegate device (user device 810, messages 234C and 236C).

The server 120 forwards the notification 170 to the server 130 with which the user device 150 (and/or one or more delegate user devices) can be registered. The server 130 sends the notification tap 175 to the device application 160 on the user device 150, and subsequently, the device application 160 receives a message 180 bearing the notification content 182. As discussed herein, separation of the notification into the notification tap 175, which can correspond to one or more coalesced notifications for different device applications 160 on the user device 150, from delivery of the notification content 182 provides for a low latency, minimal bandwidth push indication of the availability of notification, which can be retrieved responsive to on demand pull requests from the user device 150 (and/or from one or more delegate user devices). Notification content is also referred to herein, as a notification content package or as notification content packages.

The user device 150 (and user device 810, introduced in FIG. 8) can represent a device having wireless communications capabilities, such as a smart phone (e.g., an iPhone®), a tablet device (e.g., an iPad®), a wearable computing device (e.g., an Apple Watch™), a portable media player (e.g., an iPod®), a laptop computer (e.g., a MacBook®), a desktop computer (e.g., an iMac®), a digital media server/extender (e.g., an Apple TV®), among other possible devices. Additional user devices, which can connect to the user device 150 and provide audio, video, and/or data media interfaces supplemental to the user device 150, can include a wireless headset, a vehicle sound system, a digital television, a digital media recorder, a wearable computing device or any other suitable wireless device capable of wireless communication and input/output capabilities.

FIG. 2 illustrates a diagram 200 of an exemplary message flow in a notification tap architecture, according to some embodiments. Time advances from top to bottom, as illustrated by the time axis on the left. Across the top of the figure, headings are provided identifying the application server 110, server network 140, and the user device 150. Within the user device 150, an operating system 210 and the device application 160 are indicated. The vertical lines below the headings provide a timeline for messages that originate or terminate at the corresponding entity or network, or events or activities associated with an entity or network at a particular time. Messages between entities, in some instances, are represented as numbered arrows, with functional description provided in the corresponding description herein.

Figure 3:
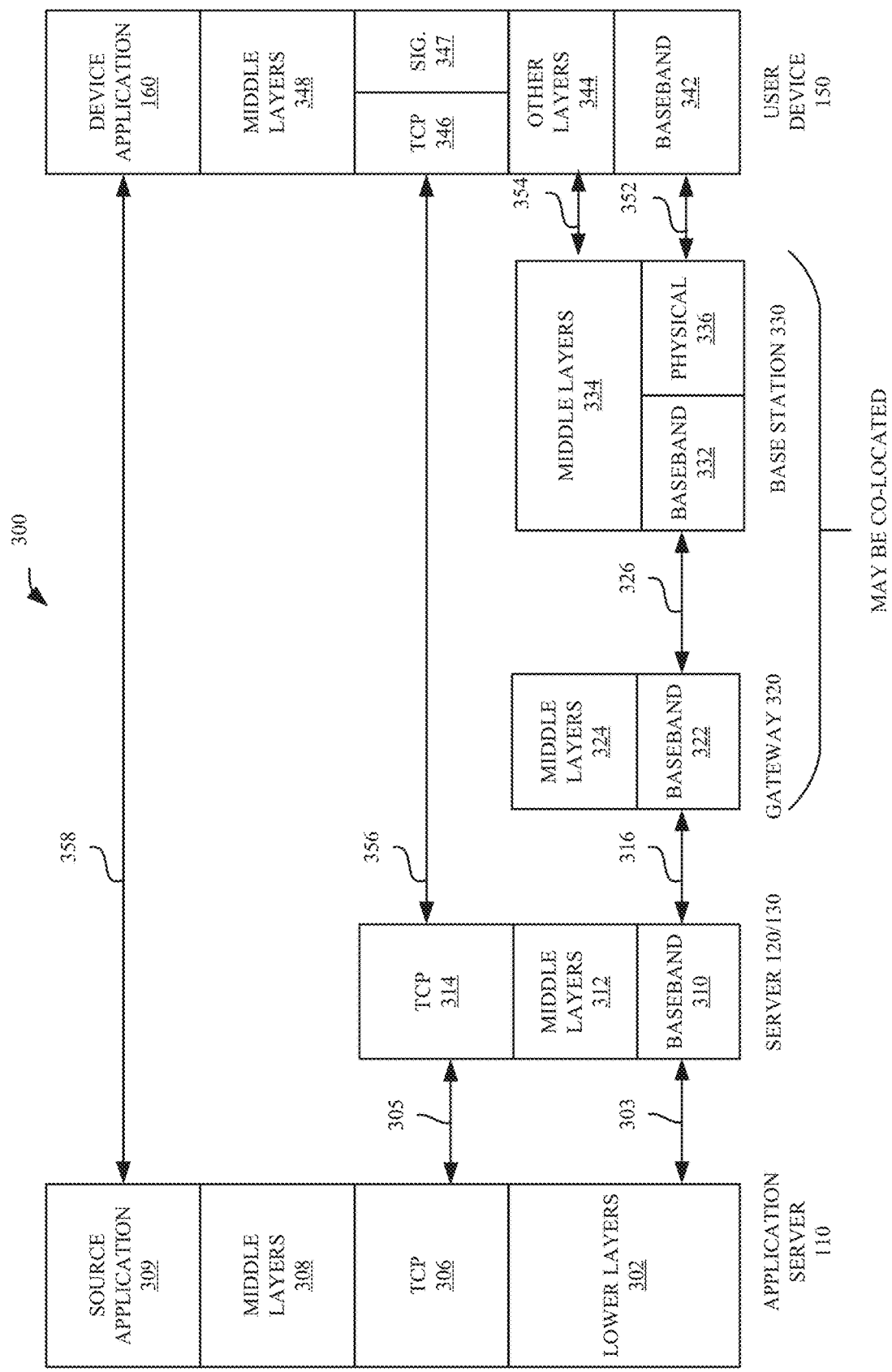
FIG. 3 illustrates an exemplary stack diagram in the notification tap architecture of FIG. 1 with a gateway and base station also illustrated, according to some embodiments.

At a time $t_0$, an event 220 occurs at the application server 110 (for example, in a source application 309, as illustrated further in FIG. 3). The application server 110, in response to the event 220, sends a notification 170 to the server network 140. Within the server network 140, a mapping 222 occurs that determines a network server that is near, or proximate to, the user device 150. The notification is forwarded to the proximate network server (for example, the server 130) and the proximate server finds a routing 224 to reach a gateway (for example gateway 320, as illustrated further in FIG. 3) that can forward a notification tap to the user device 150. The proximate network server performs an update 226 to a notification history 228 of notifications for the user device 150. The notification tap 175 at time $t_1$, via the gateway (not shown), reaches the operating system 210 of the user device 150. The operating system 210, in some embodiments, sends a message 230 to the device application 160 and receives a response message 232. The notification content is fetched at a time $t_2$. FIG. 2 indicates this time schematically or qualitatively. In some embodiments, the operating system 210 obtains the notification content (or notification content package), from the server network 140 by sending message 234A and receiving the notification content in a message 236A. In some embodiments, the operating system 210 obtains the notification content (or notification content package), from the application server 110 by sending message 234B and receiving the notification content in a message 236B. The alternative entities delivering the notification content to the user device 150 are marked with dashed ellipses and the annotation "alternatives" in FIG. 2. At a time $t_3$, message 180, bearing the notification content 182, is received by the device application 160. The notification content, in some embodiments, is a social media message, a software update, part of correspondence with a web retailer or web-based auction service, for example. The device application 160 then processes the notification content as appropriate. In some embodiments, notification content is cached at the proximate network server of the server network 140. In some embodiments, the user device 150 (or a delegate user device) retrieves the notification content 182, in response to the notification tap 175, via the proximate network server of the server network 140, either from notifications cached at the proximate network server or dynamically retrieved by the proximate network server from the application server 110.

FIG. 3 illustrates an exemplary stack diagram 300 that shows particular portions of protocol stacks for various entities in a notification tap architecture. Not all layers are shown; some layers are represented as a single layer. A protocol stack of the application server 110 includes a source application 309, middle layers 308, a transport control protocol (TCP) layer 306, and lower layers 302. An exemplary protocol stack of servers 120 and 130 includes a TCP layer 314, middle layers 312, and a baseband layer 310. A protocol stack of a gateway 320 includes middle layers 324 and baseband layer 322. A protocol stack of a base station 330 includes a baseband layer 332 directed to the gateway 320 and a physical layer 336 directed to user device 150. The protocol stack of the base station 330 also includes middle layers 334. The user device's 150 protocol stack includes the device application 160, middle layers 348, TCP layer 346, other layers 344, and baseband 342. The base station 330 may be a cellular base station or, in some embodiments, a Wi-Fi access point (AP). The terms baseband layer and physical layer are used interchangeably herein.

The device-server communication of FIG. 3 is illustrated as a peer-protocol level communication path 358. The TCP connection between the application server 110 and the server 120 (shown as server 120/130 in FIG. 3) is shown as path 305. The TCP connection between server 130 and the user device 150 is shown as path 356. Base station 330 middle layers 334 communicate with the other layers 344 of the user device 150 on path 354. Physical layer paths are shown as 303, 316, 326, and 352. The gateway 320 and the base station 330 may be co-located. Other middle-layer protocols are available, for example the fiber-oriented SONET protocols and circuit-like asynchronous transport mode (ATM); TCP is simply representative of a network protocol.

Path 358 illustrates communication activity of representative embodiments disclosed herein that efficiently support notifications in a scalable manner. The notification architecture allows many TCP connections from many application servers to exist via paths such as 305 and to not burden the base station 330 or the MNO network in which the base station 330 is integrated. The server 130 can reach the gateway 320 over the Internet. The application server 110 can reach the server 120 over the Internet. The notification architecture illustrated decouples the application server 110 from routing details of the notification such as the participation of the gateway 320 to provide notification to the user device 150. The cooperation of the gateway 320 and the base station 330 allows delivery of the notification tap 175 to the user device 150 via path 354 and without the use of TCP path 356. In terms of protocol layers, other layers 344, in some embodiments, passes the notification tap received over path 354 using a primitive inter-layer message directed to the layer labeled as SIG. 347 in FIG. 3 (e.g., SIG. 347 is an RRC signaling layer, in some embodiments). SIG. 347 then passes the notification tap up to the middle layers 348 and finally it reaches the device application 160 without using the TCP layer 346 of the protocol stack of the user device 150.

Figure 4:
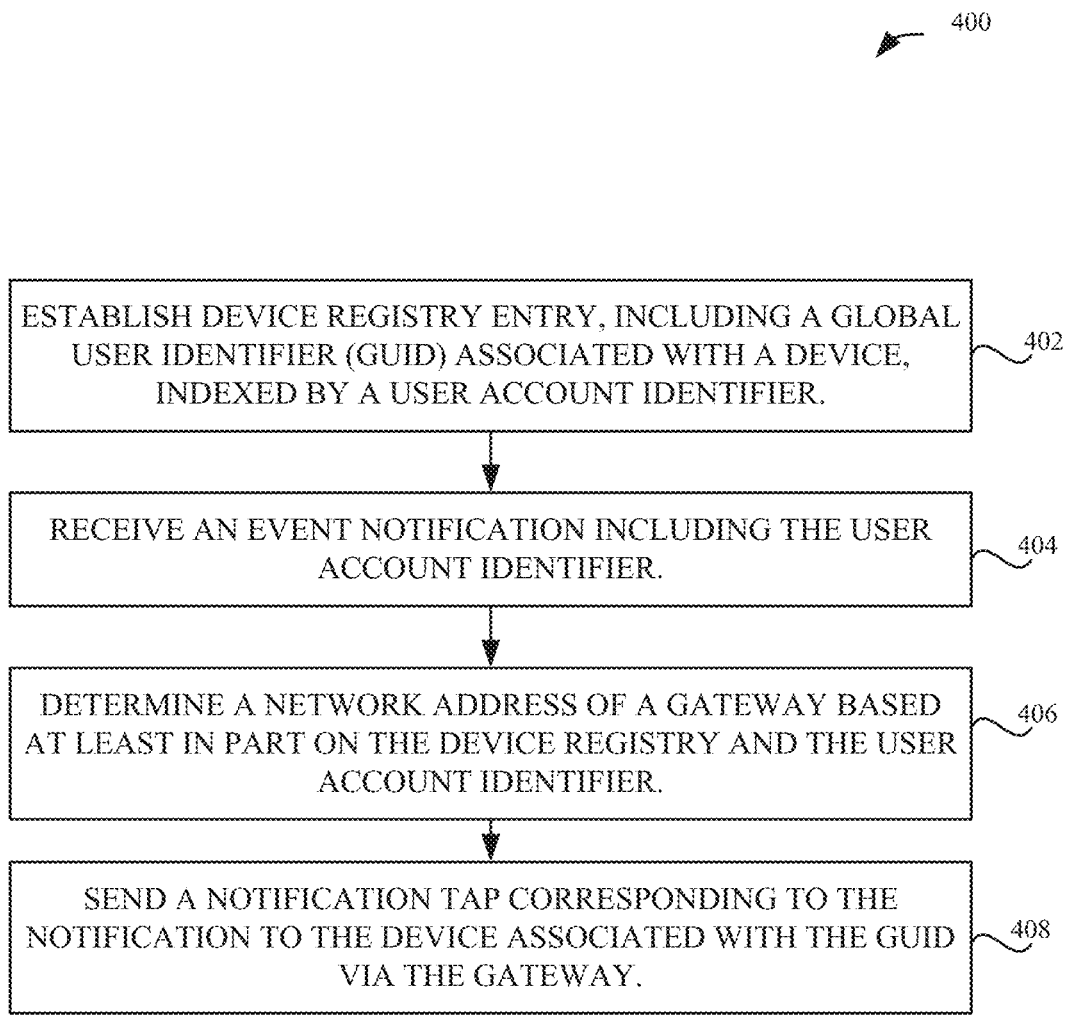
FIG. 4 illustrates exemplary logic performed by a server of a server network, according to some embodiments.

FIG. 4 illustrates a diagram 400 of exemplary logic performed by the server network 140 to deliver a notification tap to a user device such as the user device 150. At 402, the server network 140 establishes a device registry entry including a global user identifier (GUID) associated with a device. The GUID can be a value leased by a wireless service provider from a original equipment manufacturer (OEM) of the user device 150. The entry can be indexed (or addressed) by a user account identifier (which can also be referred to as a user account alias). At 404, the server network 140, for example the server 120, receives an event notification from an application server, for example, the application server 110. The application server 110 reaches the server 120 based on an association that it recognizes, for example, based on a previously-stored database entry, between the user account alias and the server network 140. The notification is then forwarded within the server network 140 (not illustrated in FIG. 4). At 406, a member of the server network 140, for example, the server 130, determines a network address of a gateway based on accessing the device registry using the user account identifier as an address. At 408, the server network 140, for example, the server 130, sends a notification tap corresponding to the notification, via the gateway, to the user device associated with the GUID. For example, the gateway 320 can make use of the base station 330 to deliver notification tap 175 to the user device 150 via path 354.

Figure 5:
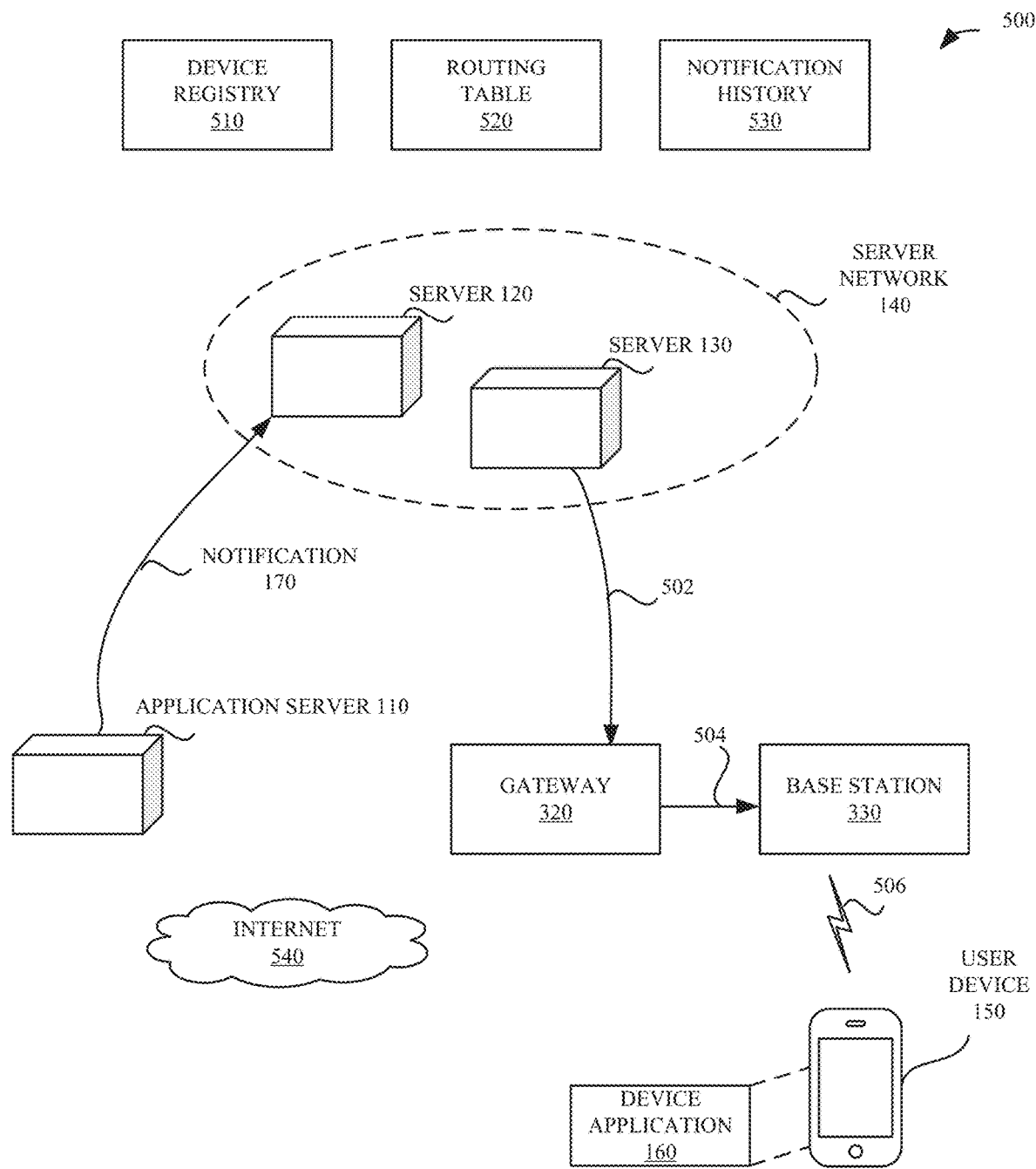
FIG. 5 illustrates an exemplary notification tap architecture, including illustration of a device registry, a routing table, and a notification history, according to some embodiments.

FIG. 5 illustrates a diagram 500 including additional elements of the notification tap architecture introduced in FIG. 1. A wireless connection from the base station 330 to the user device 150 is shown as a jagged line labeled 506. The connection from the server 130 to the gateway 320 is shown as 502. 502 may be realized using the Internet 540. A device registry 510, a routing table 520, a notification history 530, and the Internet 540 are illustrated. The application server 110, elements of the server network 140, and the gateway 320, in some embodiments, communicate via the Internet 540. The device registry 510 holds entries such as those shown in Table 1.

TABLE 1

Device Registry, Example Entries

| Row Index | User Account Alias | Device | GUID |
|---|---|---|---|
| 1 | Kris | iphone7 | 2343-dd4f-23r-23 |
| 2 | Kris | watch | rty5-45-2-4456fr |
| 3 | Kris | iMac | 546-rw-32-dvvb |
| 4 | Kris | Macbook | 232-csdf-css-wqw |

The device registry 510 is populated with entries when a user installs a given device application on a device, for example, the device application 160 installed on the user device 150. An application server, for example the application server 110, associated with the device application is informed of the user account alias and of an address associated with the server network 140. After the user device 150 obtains a GUID from the server network 140, the GUID is entered into the device registry and associated with the user account alias. A server of the server network 140 reading a GUID value from the device registry is able to determine a server of the server network 140 that is nearby to the user device 150. Such a server is sometimes referred to herein as a proximate server. The server 130 is the proximate server with respect to the user device 150. In some embodiments, the server 130 communicates to the user device 150 via gateway 320 which is interconnected to base station 330 over connection 504.

The routing table 520 holds entries such as those illustrated in Table 2. "Address_1," and "Generic_ID_1," etc., are simply representative of actual numerical or character string values. In some embodiments, a network may use an IMSI as the generic identifier.

TABLE 2

Routine Table, Example Entries

| Row Index | GUID | GW address | Device Identifier |
|---|---|---|---|
| 1 | 2343-dd4f-23r-23 | Address_1 | Generic_ID_1 |
| 2 | rty5-45-2-4456fr | Address_1 | Generic_ID_2 |
| 3 | 546-rw-32-dvvb | Address_1 | N/A |
| 4 | 232-csdf-css-wqw | Address_1 | N/A |

The notification history 530 holds database entries such as those illustrated in Table 3. "Time_1," etc., are simply representative of actual numerical values.

TABLE 3

Notification History, Example Entries

| Row Index | GUID | Source (Application Server) | Timestamp |
|---|---|---|---|
| 1 | 2343-dd4f-23r-23 | messages.apple.com | Time_1 |
| 2 | 2343-dd4f-23r-23 | newsfeed.apple.com | Time_2 |
| 3 | 2343-dd4f-23r-23 | wsj.com | Time_3 |
| 4 | 2343-dd4f-23r-23 | twitter.com | Time_4 |

Figure 6:
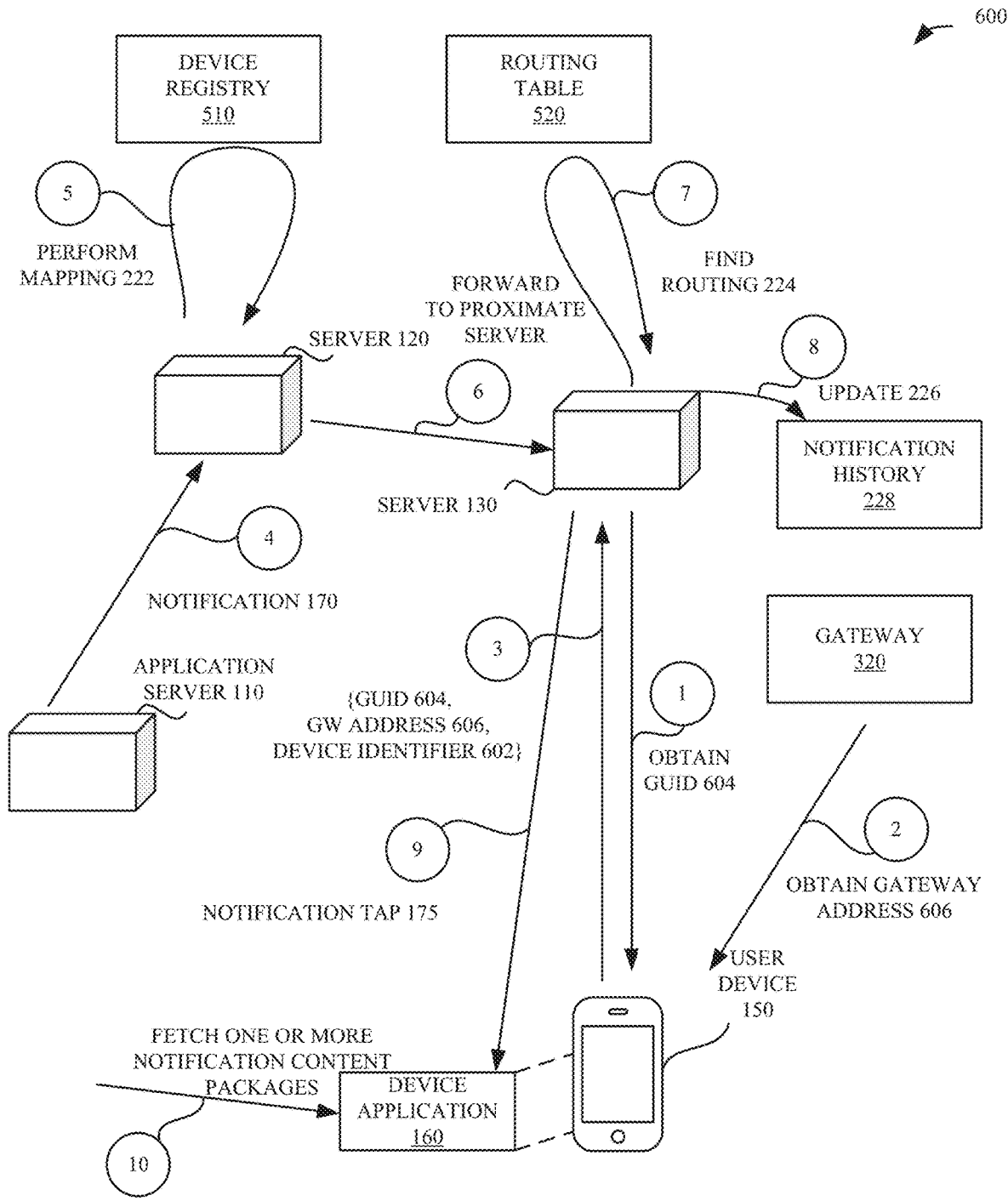
FIG. 6 illustrates exemplary activities in the architecture of FIG. 5, according to some embodiments.

FIG. 6 illustrates a message flow/activity diagram 600 for a notification tap architecture with messages and activities indicated. In FIG. 6, connecting pathways between architectural elements are not shown. Ordinal numbers in circles indicate successive messages or activities. The first activity is thus marked with a numeral 1 inside a circle and is annotated "Obtain GUID 604". That is, at some point in time, the user device 150 obtains a GUID value from the server network 140. The illustrative GUID in FIG. 6 is indicated with the reference numeral 604. The encircled numeral 2 indicates that the user device 150 obtains the gateway (GW) address 606. The encircled numeral 3 indicates that the user device 150 provides a triplet of values (or three-tuple) to the server 130. The three-tuple includes GUID 604, the GW address 606, and a device identifier 602. For example, the device identifier 602, in some embodiments, is an IMSI value of a subscriber identity module (SIM) or electronic SIM (eSIM) present on the user device 150. The three-tuple is used to populate a row in the routing table 520, such as illustrated in Table 2. The encircled numerals 1, 2, and 3 refer to activities and messages that establish state values in the architecture. The messages and activities 4-10 illustrate message flow to achieve the protocol path 358 by which the source application 309 communicates with the device application 160. The server network 140 uses the device registry 510, the routing table 520 and the gateway 320, in some embodiments, to achieve communication over the protocol path 358 in a scalable manner.

Encircled numeral 4 refers to notification 170 being sent by the application server 110 to the server 120. Notification 170 is created by the application server 110 after an event, in some embodiments, in the source application 309. In response to the notification 170, the server 120 performs mapping 222 using the device registry 510 to associate a user account alias with a GUID, indicated by encircled numeral 5. Based on the mapping 222, the server 120 knows that the retrieved GUID corresponds to the server 130. Thus, the server 120 sends, as indicated by encircled numeral 6, the notification 170 to the proximate server, in this case, the server 130. Server 130 then needs to send a notification tap 175 via a gateway and learns the gateway by reference to the routing table 520, indicated in FIG. 6 as "find routing, 224." In some embodiments, the server 130 includes the value of the device identifier 602 found in the routing table 520 in a message to the gateway 320. A home location register (HLR) associated with the MNO operating base station 330 can find a cell tower, based on a registration entry including the device identifier 602 (in some embodiments, an IMSI), from which the user device 150 can be reached with the signal 506.

The server 130 also augments a notification history 228 by performing an update 226 to add the notification 170 along with a current timestamp to the list of recent notifications recorded in the notification history 228. Encircled numeral 9 refers to delivery of the notification tap 175 to the device application 160. This delivery, in some embodiments, is through the gateway 320 and the base station 330. The device application, in some embodiments, then requests the notification content 182 corresponding to the notification tap 175 (e.g., using request message 230 shown in FIG. 2). The notification content 182, also referred to as one or more notification content packages, is delivered to the device application 160 from the application server 110 or the server network 140, in some embodiments (e.g., messages 236A or 236B of FIG. 2).

In some embodiments, the user device 150 sends the GUID 604 to the server 130 with a particular timestamp value in an inquiry message. The inquiry message can be delivered using a wireless LAN, e.g., Wi-Fi, cellular or wired connection, depending on the connectivity of the user device 150. The server 130 then forms an update message including those notification taps in the notification history more recent than the particular timestamp value and sends the update message to the user device 150. The user device 150 then provides the notification taps to one or more respective device applications (all the notification taps need not be for the same device application) in the user device 150. In some instances a cellular connection is used. After the one or more device applications request notification content packages and those have been delivered to the user device 150 over the cellular connection, the user device 150, in some embodiments, disconnects from the cellular connection.

Figure 7:
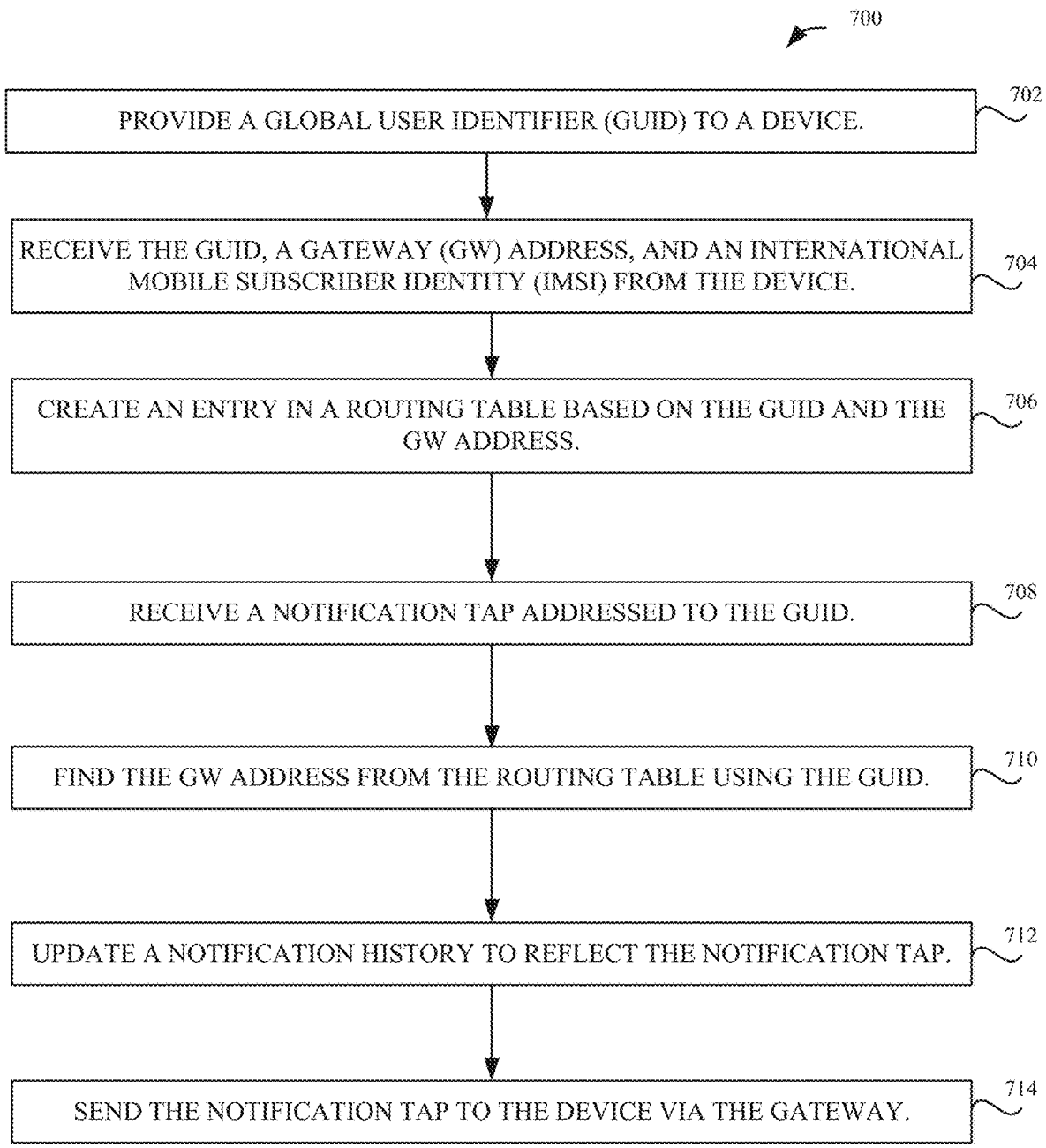
FIG. 7 illustrates exemplary logic of a server corresponding to some of the events of FIG. 6, according to some embodiments.

FIG. 7 illustrates exemplary logic 700 for operation of a server, for example, server 130 in relation to the user device 150. At 702, the server provides a GUID to a device. For example, the server 130 provides the GUID 604 to the user device 150. At 704, the server receives a three-tuple including the GUID, a gateway (GW) address, and a device identifier (in some embodiments, an IMSI value of a SIM or eSIM in the device). At 706, the server creates an entry in a routing table based on the GUID and the GW address. Network state has now been set. In some instances, a notification tap is then received, such as at 708. The server, at 710, then finds a GW address from the routing table by reading the routing table based on the GUID. The server, at 712, updates a notification history to include the notification tap and a current timestamp value. At 714, the server sends the notification tap to the device via a gateway reached using the GW address.

Delegation of Presence

Many services are supported by network access. The term "presence" includes meanings of an ability of a device to be reached via a network. To support presence, including the ability to receive notifications, a user device can make use of peers that have wall-power and possibly wired Internet connectivity. Instead of the user device registering with a gateway to receive notification taps, a user device may delegate this task (which can be referred to as "delegating presence") to a peer device better able to receive the notification taps. For example, the peer device may be a desktop computer with wall power and a wired Ethernet connection. A user device, that is, a delegating device, may delegate to more than one peer device. The delegate device may provide cache storage of notification taps and of multiple notification content packages. The delegate device acts as an intermediary between the proximate server and the delegating devices. The delegate device is reached by the proximate server via a wired connection and/or via a wireless connection, depending on circumstances. Selection of the delegate device is performed by a multi-device algorithm based on physical proximity, network connectivity and/or power-availability of each device.

Figure 8:
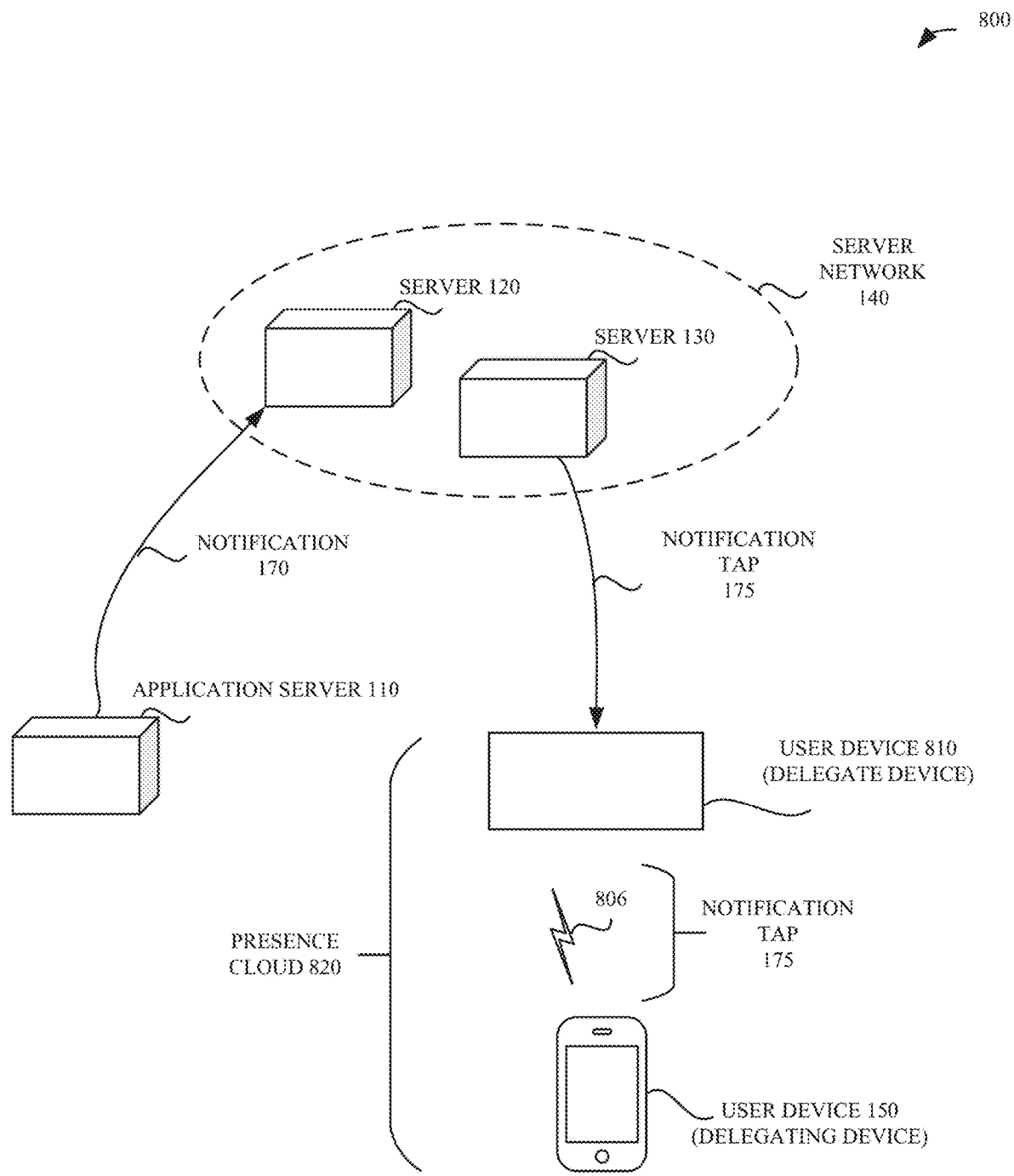
FIG. 8 illustrates an exemplary notification tap architecture including a presence cloud, according to some embodiments.

FIG. 8 illustrates a diagram 800 of a notification tap architecture including a delegation feature. The user device 150 delegates reception of notification taps to another device, for example, a user device 810.

User device 810 may be one of several device types. For example, user device 810 in some embodiments is a cellular phone, a tablet, a laptop, a desktop computer, a wireless-enabled wearable device such as a watch, or an internet-connected media server. In some instances, the user device 810 is the destination of the notification tap 175 and, subsequently, the notification content 182. User device 810 can be a non-cellular device and can be reached without use of a cellular network, in some embodiments.

Figure 10:
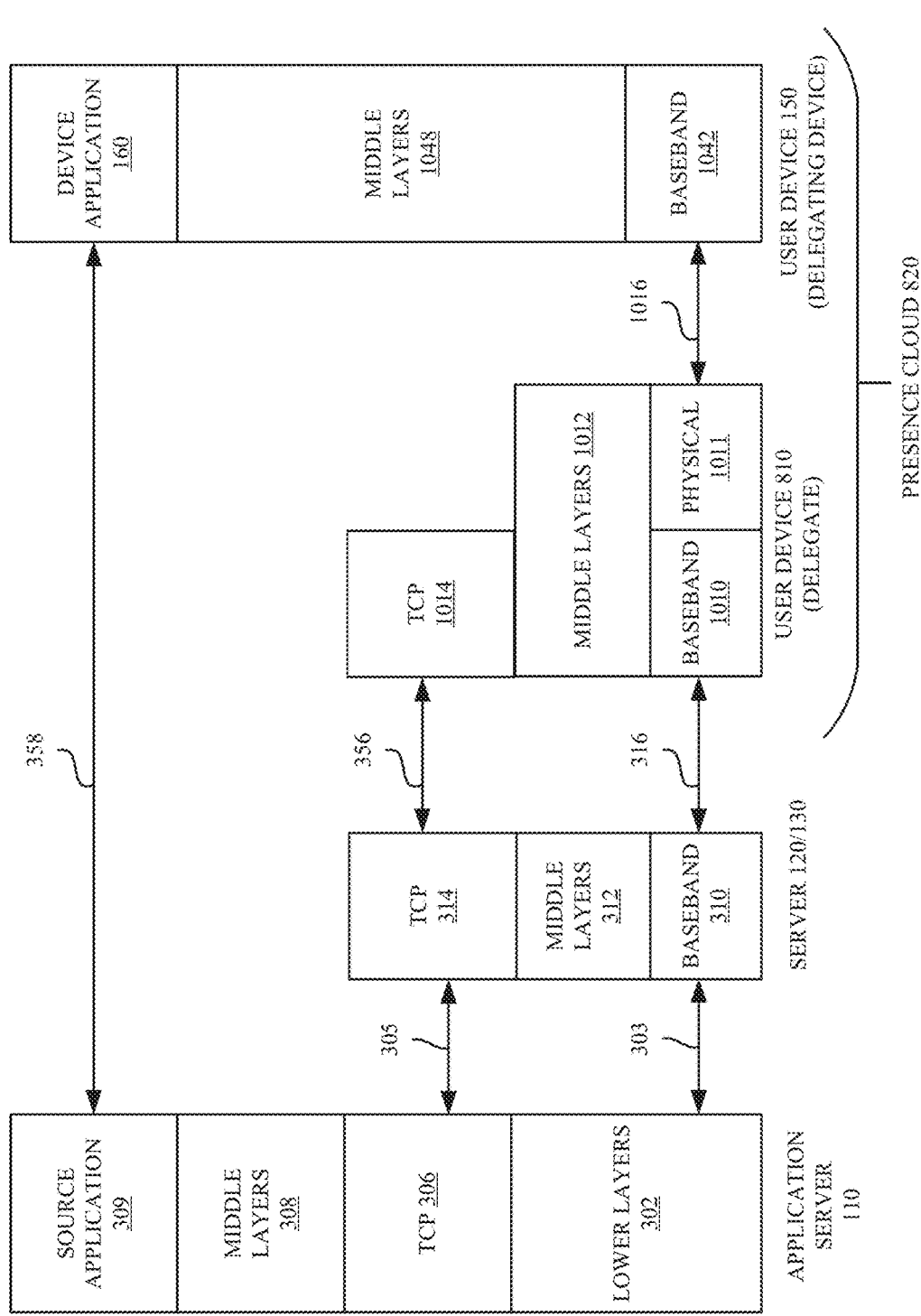
FIG. 10 illustrates exemplary protocol stacks of entities in a notification tap architecture that includes a presence cloud, according to some embodiments.

The user device 150 is referred to in FIGS. 8 to 10 as a delegating device, and the user device 810 is referred to in FIGS. 8 to 10 as a delegate device. User device 810, in some instances, has access to wall-power and/or a wired Ethernet connection. One or more delegating devices, in some instances are in communication with the user device 810. Any or all of the delegate device and the delegating device(s) in a presence cloud 820 can be the recipients of the notification tap 175; one or more may then receive or request the notification content 182.

FIG. 8 illustrates user device 150 as a delegating device in communication with the user device 810 via a wireless connection 806. User device 810 and user device 150 are referred to herein as members of the presence cloud 820. The user device 150, in some embodiments, delegates presence to more than one peer device. Thus, user device 810 and another delegate device may both receive the notification tap 175 and forward it to the user device 150. Wireless connection 806 within the presence cloud 820, in some connections, is a low energy consumption, short-range connection supported by a communication format such as Bluetooth low energy (BLTE). The user device 810, in some embodiments, requests one or more notification content 182 or notification content packages from application server 110 and/or other application servers associated with other applications. The user device 810 caches these notification content packages until the user device 150 requests delivery of the notification content 182 to the user device 150.

A message flow including delegation of presence is similar to that described in FIG. 6 for the notification taps, up to the point that the proximate edge server receives the notification (encircled numeral 6 of FIG. 6). The following 6 steps or activities illustrate delivery of a notification tap in an architecture including a delegate device.

1) The proximate edge server (FIG. 8, server 130) receives the notification (also see steps leading up to an including encircled numeral 6 of FIG. 6).

2) The proximate edge server recognizes the delegate device (FIG. 8, user device 810) as the target (next) recipient of the notification.

3) The proximate edge server sends a notification tap (first instance of notification tap 175 in FIG. 8) to the delegate device (user device 810).

4) The delegate device may request the notification content from the proximate edge server and cache it for the benefit of one or more delegating devices.

5) The delegate device sends the notification tap (second instance of the notification tap 175 in FIG. 8) to the one or more delegating devices (for example, user device 150, FIG. 8).

6) Each notification includes a sequence-number-like identifier so that the recipient delegating device can discard notification taps already received.

Thus, the delegating devices in the presence cloud (for example user device 150 in presence cloud 820 of FIG. 8) can make use of peers in the presence cloud that have wall-power. Because the events associated with the source application in the application server are parsed into notification taps and notification content, a need for intermediate storage is reduced or eliminated. This parsing, in some embodiments, may occur at the application server 110 or in the server network 140. Encryption to protect payload (notification content) can be provided on the notification content after the recipient user device (for example, user device 150 of FIG. 8) has established a persistent data connection. A user of the delegate device and delegating device do not need to be involved in identifying a device to be the delegate device. By using concurrent delegation to multiple peers, the probability is increased of low-latency notification content delivery while simultaneously maintaining only low power requirements at the delegating device. Caching of notification content at the proximate edge server (for example, server 130 of FIG. 8) or at the delegate device (for example, user device 810 of FIG. 8) also reduces latency. Future architectural/network changes to last-hop delivery modes are not propagated to the application server 110 because it has constant interfaces of the interface to the Internet 540 and the interface to the collection of edge servers in server network 140. When a user takes some devices to another geographic location, distinct delegate devices can be identified by instances of the multi-device algorithm running in devices associated with the user account alias at each separate geographic location. User account alias usage is described above with respect to Table 1, for example.

FIG. 9 illustrates a diagram 900 of messages and activities in a notification tap architecture including a delegate device and a delegating device. Event 220, in FIG. 9, occurs at the source application 309 in the application server 110. A notification 170 is sent to the server network 140 and intra-network forwarding, mapping 222, routing 224, and update to notification history 228 occur as in encircled numerals 4, 5, 6, 7, and 8 of FIG. 6. Notification tap 175, which will ultimately reach the device application 160 in the user device 150, is sent to user device 810 (which is the delegate device) of the presence cloud 820. User device 810 forwards, within the presence cloud 820, the notification tap 175 to the user device 150 (which is the delegating device). Operating system 210 and device application 160 communicate with messages 230 and 232 as in FIG. 2. Three alternatives are shown in FIG. 9 for delivery of the notification content 182 to the device application 160. The alternatives of fetching from the server network 140 with messages 234A and 236A or of fetching from the application server 110 with messages 234B and 236B were discussed with respect to FIG. 2. A third alternative of fetching from the delegate device within the presence cloud 820, user device 810, is shown realized with messages 234C and 236C. After one or more of these fetch sequences occurs, the device application 160 receives the notification content 182 in a message 180, similar to the completion of the communication shown in FIG. 2 and also as represented by path 358 of FIG. 3, however now with the participation of the user device 810, at least with respect to delivery of the notification tap 175.

FIG. 10 illustrates a diagram 1000 that provides an updated version of the protocol stack diagram of FIG. 3 with the user device 810 assisting in the last-hop delivery from the server network 140 possibly without use of the base station 330. In some embodiments, the base station 330 is present and provides, including use of the gateway 320, a path to the user device 810. Path 358 from the source application 309 to the device application 160 is achieved with the assistance of the user device 810 acting as a delegate. The protocol stack of the user device 810 includes a baseband layer 1010 in communication with a baseband layer 310 of server network 140 (as represented by server 120/130 in FIG. 10), middle layers 1012, and, in some embodiments, a TCP layer 1014. A physical layer 1011 is shown in communication over a path 1016 with a baseband layer 1042 of the user device 150. Physical and baseband layers refer generally to modulation and electrical waveform transmitters and receivers (wired or wireless), payload and signaling transmission and reception, formatting of packets, and retransmission and channel coding operations. The terms physical layer and baseband layer are used interchangeably herein. Above the baseband layer 1042 of the delegating user device 150, middle layers 1048 communicate with higher layers that can include device applications 160 that communicate with application servers 110.

A peer-to-peer TCP connection, for example, is shown from the TCP layer 306 of the application server 110 to the TCP layer 314 of server 120/130 of the server network 140 (path 305) and to TCP layer 1014 of the user device 810 (path 356). In some embodiments, the user device 810 receives both wall-power and has a high speed Ethernet connection (either wired or wireless). In some embodiments, frequent high-bandwidth transmissions over the path 356, for example, are not an energy concern for the user device 810. In some instances, the server network 140 is not involved and application server 110 reaches the user device 810 for delivery of notification content (as opposed to notification taps) via the Internet 540. For example, in some embodiments, TCP layer 1014 and baseband layer 1010 are used to connect to the application server 110 over the Internet 540 to recover notification content. Other application servers also connect in to the server network 140, forming a fan-in of notifications coming into the server network 140 and efficiently conveyed to hundreds of millions of devices, including user device 150. User device 810 communicates with the user device 150 within the presence cloud 820 over the path 1016. In some embodiments, the transmission/reception method used to communicate over the path 1016 is a low energy protocol such as BTLE.

Figure 11:
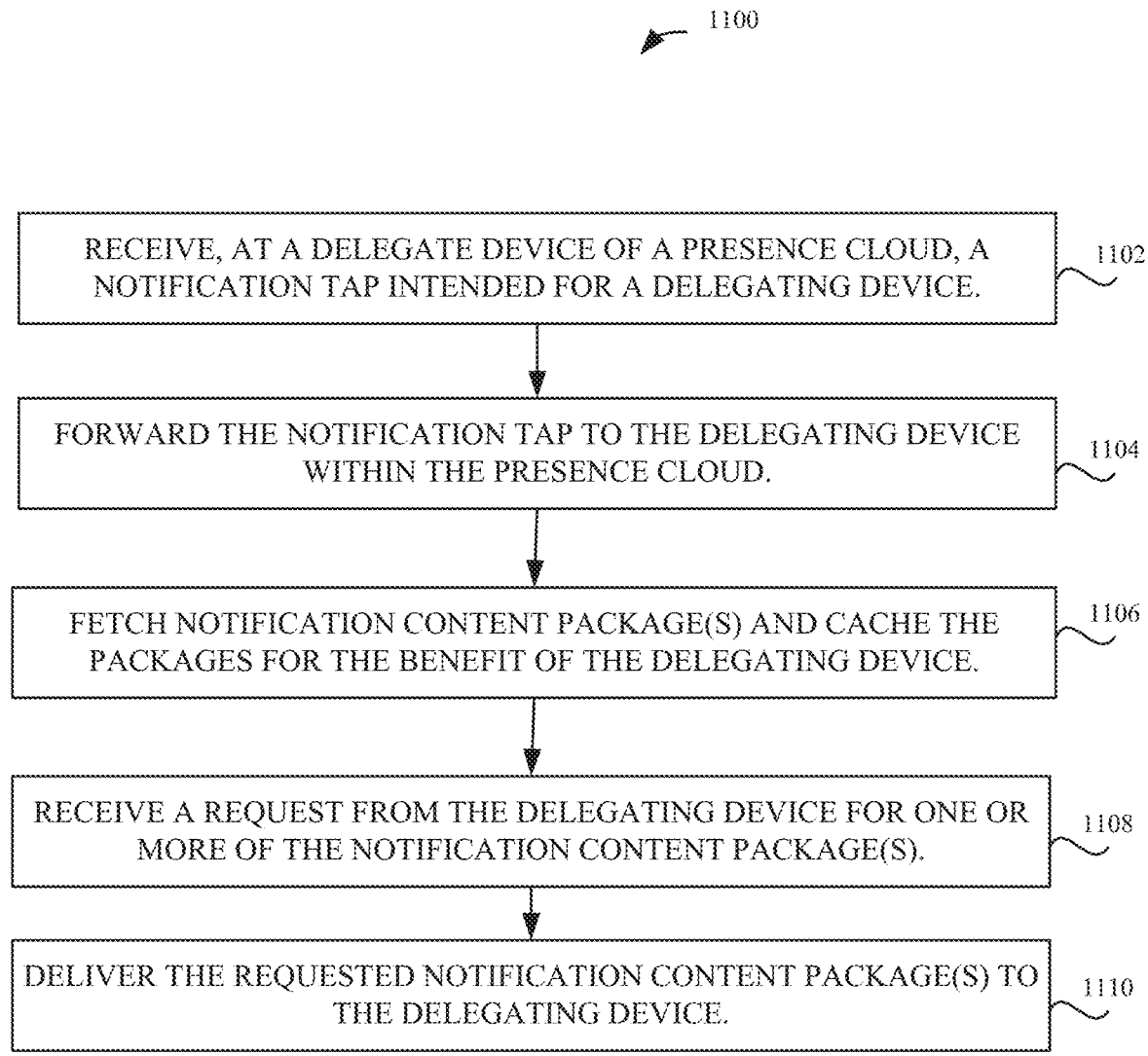
FIG. 11 illustrates exemplary logic for a delegate device supporting delivery of a notification tap and of notification content packages to a delegating device, according to some embodiments.

FIG. 11 illustrates a diagram 1100 of exemplary logic performed by a delegate device, according to some embodiments. At 1102, a delegate device in a presence cloud receives a notification tap intended for a delegating device that is a member of the presence cloud. At 1104, the delegate device forwards the notification tap to the delegating device. At 1106, the delegate device recovers notification content, referred to here as notification content packages. The notification content, in some embodiments, is fetched from a server network and/or from one or more application servers. At 1108, the delegate device receives a request from the delegating device for one or more notification content packages. At 1110, the delegate device delivers the requested one or more content packages to the delegating device. The delegating device then acts on the notification content, which may be for example, a social media message, a software update, a transactional message with a web retailer, and/or any other notification-type content.

Wireless devices, and mobile devices in particular, can incorporate multiple different radio access technologies (RATs) to provide connections through different wireless networks that offer different services and/or capabilities. A wireless device can include hardware and software to support a wireless personal area network (WPAN) according to a WPAN communication protocol, such as those standardized by the Bluetooth® special interest group (SIG) and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network (WLAN) and/or to a wireless wide area network (WWAN) to a wide variety of services that can be supported by various applications executing on the wireless device. Thus, communication capability for a secondary wireless device, e.g., without and/or not configured for WWAN communication, can be extended using a local WPAN (or WLAN) connection to a primary wireless device that provides a WWAN connection. Alternatively, the secondary wireless device can also include wireless circuitry for a WLAN connection and can originate and/or terminate connections via a WLAN connection. Whether to use a direct connection or a relayed connection can depend on performance characteristics of one or more links of an active communication session between the secondary wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a primary wireless device can be preferred. By monitoring performance of an active communication session and availability and capabilities of associated wireless devices (such as proximity to a primary wireless device), a secondary wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point", "user equipment" (UE), "wireless user device", and "user device" may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that wireless devices described herein may be configured as multi-mode wireless communication devices that are also capable of communicating via different third generation (3G) and/or second generation (2G) RATs. In these scenarios, a multi-mode wireless device can be configured to prefer attachment to LTE networks offering faster data rate throughput, as compared to other 3G legacy networks offering lower data rate throughputs. For instance, in some implementations, a multi-mode wireless device may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Exemplary Computing Device

Figure 12:
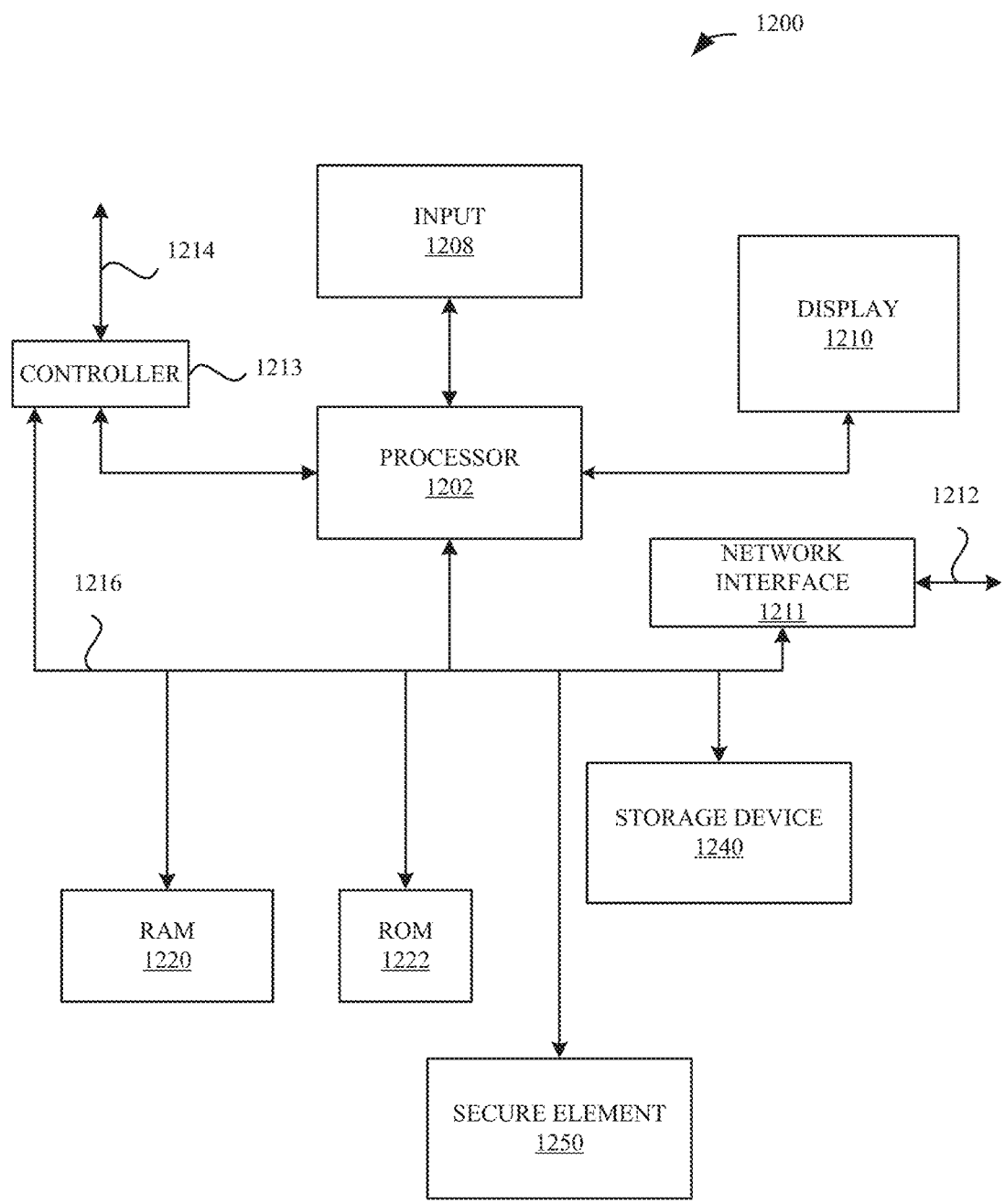
FIG. 12 illustrates an exemplary computing device for realizing various devices disclosed herein, according to some embodiments.

FIG. 12 illustrates in block diagram format an exemplary computing device 1200 that can be used to implement the various components and techniques described herein, according to some embodiments. In particular, the detailed view of the exemplary computing device 1200 illustrates various components that can be included in the user device 150, the user device 810 the server 130, the server 120, the gateway 320, and the base station 330 illustrated in various figures, including FIGS. 1, 3, 5, 6, 8, 9, and 10. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, visual/silent alert notifications and/or information relating to incoming, outgoing, or active communication sessions). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor.

The computing device 1200 also includes a storage device 1240, which can includes a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200. The computing device 1200 can include a secure element (SE) 1250. The SE, in some embodiments is a universal integrated circuit card (UICC) or an embedded UICC (eUICC). The SE, in some embodiments, has present on it one or more SIMs or eSIMs.

Representative Embodiments

In some embodiments, a method for delivering notification to a device includes a network server: (i) receiving, from the device, a message including: a user account identifier, a global user identifier (GUID), and a device identifier; (ii) creating an entry in a device registry, the entry including: the user account identifier, the device identifier, and the GUID; (iii) receiving from an application server a notification including the user account identifier; (iv) determining a network address of a gateway associated with the device based at least in part on the user account identifier and the entry in the device registry; and (v) sending a notification tap corresponding to the notification to the device associated with the GUID via the gateway using the network address of the gateway associated with the device.

In some embodiments, the GUID includes a value leased by a wireless service provider from an original equipment manufacturer (OEM) of the device. In some embodiments, the device registry includes a second entry associated with the user account identifier, the second entry including a second device identifier associated with a second device, and the device and the second device are distinct devices. In some embodiments, the method further includes the network server determining a second network address of a second gateway associated with the second device based at least in part on the user account identifier and the second entry in the device registry, and sending a second notification tap corresponding to the notification to the second device via the second gateway using the second network address. In some embodiments, the method further includes the network server maintaining a notification history for the device, the notification history including source identifiers for application servers and timestamp values for notifications received from the application servers. In some embodiments, the method further includes the network server receiving an inquiry message from the device, the inquiry message including the GUID and a timestamp value, and sending to the device, via the gateway, one or more notification taps corresponding to one or more notifications having timestamp values more recent than the timestamp value included in the inquiry message. In some embodiments, the method further includes the network server receiving from the device a request for notification content for the notification, and sending to the device the notification content. In some embodiments, the notification tap is sent without encryption, and the notification content is sent with secure end-to-end encryption. In some embodiments, the notification tap is sent to the device via a delegate device determined by the device. In some embodiments, the delegate device caches notification content for the notification and provides the notification content to the device separately from the notification tap. In some embodiments, the notification tap is sent to the device via a paging channel of a wireless network. In some embodiments, the device identifier includes an International Mobile Subscriber Identity (IMSI). In some embodiments, the device identifier includes a temporary identifier generated by a network with which the device is registered for a wireless service.

In some embodiments, a method for delivering notifications, to a delegating device via a delegate device, includes the delegate device: (i) providing a globally unique identifier (GUID) for the delegate device, a gateway (GW) address for a gateway proximate to the delegate device, and a user account identifier to a network server; (ii) receiving via the gateway a notification tap corresponding to a notification for the delegating device; and (iii) sending the notification tap to the delegating device, where the delegate device and the delegating device are both associated with the user account identifier.

In some embodiments, the method further includes the delegate device receiving, via the gateway, notification content associated with the notification for the delegating device; caching the notification content for subsequent delivery to the delegating device; and providing the notification content to the delegating device separately from the notification tap. In some embodiments, the method further includes the delegate device receiving from the delegating device a request for notification content associated with the notification after sending the notification tap to the delegating device, where the notification content is provided to the delegate device in response to receipt of the request for notification content. In some embodiments, the method further includes the delegate device obtaining the GUID from the network server, where the GUID includes a value leased by a wireless service provider from an original equipment manufacturer (OEM) of the delegate device. In some embodiments, the notification for the delegating device originates from an application server that stores a user account alias associated with the delegating device, and the user account alias is provided to the application server upon installation of an application on the delegating device.

In some embodiments, a method includes a network server: (i) providing a globally unique identifier (GUID) to a device; (ii) receiving the GUID, a gateway (GW) address associated with a gateway, and a device identifier from the device; (iii) creating an entry in a routing table based on the GUID, the GW address, and/or the device identifier; (iv) receiving a notification tap addressed to the device associated with the GUID; (v) accessing, based on the GUID, the GW address in the routing table; (vi) updating a notification history to include the notification tap; and (vii) sending the notification tap to the device via the gateway. In some embodiments, the notification tap is provided to the device via a paging channel.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a device to receive notifications, the method comprising, by a network server that is communicably coupled with the device:
   receiving, from the device, a message that includes a user account identifier, a global user identifier (GUID), and a device identifier associated with the device;
   creating, within a device registry, an entry that corresponds to the message; and
   in response to receiving, from an application server, a plurality of notifications associated with the user account identifier:
      determining a network address of a gateway associated with the device based at least in part on the entry within the device registry,
      generating a consolidated notification tap that corresponds to the plurality of notifications, and
      sending the consolidated notification tap to the device, wherein the consolidated notification tap, when received by the device, causes the device to issue a request to obtain the plurality of notifications.

2. The method of claim 1, wherein the GUID comprises a value leased by a wireless service provider from an original equipment manufacturer (OEM) of the device.

3. The method of claim 1, wherein:
   the device registry includes a second entry associated with the user account identifier,
   the second entry comprises a second device identifier associated with a second device; and
   the device and the second device are distinct devices.

4. The method of claim 3, further comprising:
   determining a second network address of a second gateway associated with the second device based at least in part on the user account identifier and the second entry in the device registry; and
   sending, to the second device via the second gateway using the second network address, a second consolidated notification tap corresponding to the plurality of notifications.

5. The method of claim 1, further comprising:
   maintaining a notification history for the device, wherein the notification history includes source identifiers for application servers and timestamp values for notifications received from the application servers.

6. The method of claim 5, further comprising:
   receiving, from the device, an inquiry message that includes the GUID and a timestamp value; and
   sending, to the device via the gateway, one or more notification taps corresponding to one or more notifications having timestamp values more recent than the timestamp value included in the inquiry message.

7. The method of claim 1, wherein the consolidated notification tap does not include the plurality of notifications and does not include content of the plurality of notifications.

8. The method of claim 1, wherein:
   the consolidated notification tap is sent in an unencrypted form; and
   content of the plurality of notifications is sent in an encrypted form.

9. The method of claim 1, wherein the consolidated notification tap is sent to the device via a delegate device determined by the device.

10. The method of claim 9, wherein the delegate device caches content for the plurality of notifications and provides the content to the device.

11. The method of claim 1, wherein the consolidated notification tap is sent to the device via a paging channel of a wireless network.

12. The method of claim 1, wherein the device identifier comprises an International Mobile Subscriber Identity (IMSI) associated with the device.

13. The method of claim 1, wherein the device identifier comprises a temporary identifier generated by a network with which the device is registered for a wireless service.

14. A non-transitory computer readable storage medium configured to store instructions that, when executed by a processor included in a network server, cause the network server to enable a device to receive notifications, by carrying out steps that include:
   receiving, from the device, a message that includes a user account identifier, a global user identifier (GUID), and a device identifier associated with the device;
   creating, within a device registry, an entry that corresponds to the message; and
   in response to receiving, from an application server, a plurality of notifications associated with the user account identifier:
      determining a network address of a gateway associated with the device based at least in part on the entry within the device registry,
      generating a consolidated notification tap that corresponds to the plurality of notifications, and
      sending the consolidated notification tap to the device, wherein the consolidated notification tap, when received by the device, causes the device to issue a request to obtain the plurality of notifications.

15. The non-transitory computer readable storage medium of claim 14, wherein the GUID comprises a value leased by a wireless service provider from an original equipment manufacturer (OEM) of the device.

16. The non-transitory computer readable storage medium of claim 14, wherein:
the device registry includes a second entry associated with the user account identifier,
the second entry comprises a second device identifier associated with a second device; and
the device and the second device are distinct devices.

17. The non-transitory computer readable storage medium of claim 16, wherein the steps further include:
determining a second network address of a second gateway associated with the second device based at least in part on the user account identifier and the second entry in the device registry; and
sending, to the second device via the second gateway using the second network address, a second consolidated notification tap corresponding to the plurality of notifications.

18. A network server configured to enable a device to receive notifications, the network server comprising a processor configured to cause the network server to carry out steps that include:
receiving, from the device, a message that includes a user account identifier, a global user identifier (GUID), and a device identifier associated with the device;
creating, within a device registry, an entry that corresponds to the message; and
in response to receiving, from an application server, a plurality of notifications associated with the user account identifier:
determining a network address of a gateway associated with the device based at least in part on the entry within the device registry,
generating a consolidated notification tap that corresponds to the plurality of notifications, and
sending the consolidated notification tap to the device, wherein the consolidated notification tap, when received by the device, causes the device to issue a request to obtain the plurality of notifications.

19. The network server of claim 18, wherein the GUID comprises a value leased by a wireless service provider from an original equipment manufacturer (OEM) of the device.

20. The network server of claim 18, wherein:
the device registry includes a second entry associated with the user account identifier,
the second entry comprises a second device identifier associated with a second device; and
the device and the second device are distinct devices.

* * * * *